(12) United States Patent
Chou

(10) Patent No.: US 11,125,219 B2
(45) Date of Patent: Sep. 21, 2021

(54) METHOD OF MOUNTING A BEARING TO AN AIR COMPRESSOR, AND AIR COMPRESSOR HAVING A BEARING MOUNTED BY THE METHOD

(71) Applicant: UNIK WORLD INDUSTRIAL CO., LTD., Tainan (TW)

(72) Inventor: Wen-San Chou, Tainan (TW)

(73) Assignee: UNIK WORLD INDUSTRIAL CO., LTD., Tainan (TW)

(*) Notice: Subject to any disclaimer, the term of this patent is extended or adjusted under 35 U.S.C. 154(b) by 205 days.

(21) Appl. No.: 16/204,931

(22) Filed: Nov. 29, 2018

(65) Prior Publication Data
US 2019/0162174 A1    May 30, 2019

(30) Foreign Application Priority Data

Nov. 30, 2017   (TW) ................................. 106141959

(51) Int. Cl.
| | |
|---|---|
| *F16C 43/00* | (2006.01) |
| *B23P 11/00* | (2006.01) |
| *F04B 23/02* | (2006.01) |
| *F04B 35/04* | (2006.01) |
| *F04B 35/01* | (2006.01) |
| *F04B 39/00* | (2006.01) |
| *F04B 39/12* | (2006.01) |
| *F16C 35/063* | (2006.01) |

(Continued)

(52) U.S. Cl.
CPC .............. *F04B 23/025* (2013.01); *F04B 9/04* (2013.01); *F04B 35/01* (2013.01); *F04B 35/04* (2013.01); *F04B 39/0094* (2013.01); *F04B 39/121* (2013.01); *F04B 39/14* (2013.01); *F04B 41/02* (2013.01); *F16C 35/00* (2013.01); *F16C 35/063* (2013.01); *F16C 43/00* (2013.01); *B23P 11/005* (2013.01); *F16C 2226/52* (2013.01); *F16C 2360/42* (2013.01); *F16C 2361/61* (2013.01)

(58) Field of Classification Search
CPC .... F04B 23/025; F04B 35/01; F04B 39/0094; F04B 39/121; F04B 39/14; F04B 9/04; F04B 41/02; F04B 35/04; F16C 35/063; F16C 35/00; F16C 43/00; F16C 2360/42; F16C 2361/61; F16C 2226/52; F16C 19/16; F16C 3/02; B23P 11/005; B21D 43/003; B21D 22/02

See application file for complete search history.

(56) References Cited

U.S. PATENT DOCUMENTS

| | | | | |
|---|---|---|---|---|
| 2010/0236070 | A1* | 9/2010 | Toda | ........................ F16D 1/068 29/898 |
| 2015/0285236 | A1* | 10/2015 | Chou | .................... F04B 39/127 417/415 |
| 2015/0330379 | A1* | 11/2015 | Chou | .................... F16F 15/262 417/374 |

FOREIGN PATENT DOCUMENTS

JP     2005180583 A  *  7/2005  ............ F16C 35/063

\* cited by examiner

*Primary Examiner* — Lawrence Averick

(57) ABSTRACT

A method of mounting a bearing to an air compressor including a shaft element having a first end and a second is disclosed, which includes the steps of: fixing the second end of the shaft element to a center of a gear; inserting the first end of the shaft element through a central hole of a bearing to have an annular step of the shaft element abutted an inner ring of the bearing; and hitting the first end of the shaft element by a striking tool to form an expanded or flared edge on a top face of the first end of the shaft element. With the (Continued)

method, the bearing can be firmly fixed between the expanded or flared edge and the annular step of the shaft element.

2 Claims, 11 Drawing Sheets

(51) Int. Cl.
*F04B 39/14* (2006.01)
*F04B 9/04* (2006.01)
*F04B 41/02* (2006.01)
*F16C 35/00* (2006.01)

prior art prior art prior art prior art prior art

METHOD OF MOUNTING A BEARING TO AN AIR COMPRESSOR, AND AIR COMPRESSOR HAVING A BEARING MOUNTED BY THE METHOD

TECHNICAL FIELD OF THE INVENTION

The present invention relates to a method of mounting a bearing to an air compressor, and an air compressor having a bearing mounted by the method, wherein a striking tool is employed to hit one end of a shaft element to form an expanded or flared edge on the end of the shaft element, so that the bearing can be firmly connected with the shaft element.

DESCRIPTION OF THE PRIOR ART

FIGS. 9 and 10 show a conventional air compressor 1 for vehicles, which basically comprises a base frame 11, a cylinder 12 joined to the base frame 11, a motor 13 mounted to the base 11, and a piston 14 fitted to the cylinder 12. Through a gear mechanism 15 and a crank mechanism, the motor 13 can drive the piston 14 to conduct reciprocating motion within the cylinder 12. The reciprocating motion includes an intake stroke for allowing air to enter the cylinder 12 and a compression stroke for compressing air in the cylinder 12 and forcing the compressed air out of the cylinder 12.

The gear mechanism 15 includes a first gear 151 (i.e., the driving gear), which is mounted at an axle 131 of the motor 13, and a second gear 152 (i.e., the driven gear) engaged with the first gear 151. The crank mechanism includes a counterweight 161 provided at the second gear 152, a crankshaft 162, and a crankpin 164. One end of the crankshaft 162 is fixed to a center of the second gear 152, and the other end of the crankshaft 162 is fitted through a bearing 111 located in a mounting hole 110 of the base frame 11 and fixed by a screw 17 (with external threads 171) being screwed into a threaded hole 163 of the crankshaft 162 (see FIGS. 8 and 9). In one embodiment, the other end of the crankshaft 162 can be fitted through a metal bush 112 located in a mounting hole 110 of the base frame 11, so that a snap ring 18 can be engaged with an annular groove 165 of the crankshaft 162 (see FIG. 7). The crankpin 164 is fixed to the counterweight 161. The piston 14 is connected to the crankpin 164 such that the hole 143 defined at the bottom end 142 of the rod portion 141 is fitted around the crankpin 164. Since the crankpin 164 is at an offset from the crankshaft 162, when the second gear 152 is rotated by the first gear 151, the crankpin 164 can be driven to swing in a circle around the crankshaft 162, which allows the piston 14 to conduct reciprocating motion within the cylinder 12.

FIG. 7 shows a conventional air compressor, one disadvantage of which is that the snap ring 18 is easily loosened or detached from the crankshaft 162 after the compressor has been used for a period of time. In another conventional air compressor, as shown in FIG. 8, due to insufficient depth or strength of the threads engagement between the screw 17 and a threaded hole 163 of the crankshaft 162, the screw 17 is easily loosened from the crankshaft 162. As a result, the metal bush 112 or the bearing 111 cannot be properly connected with the crankshaft 162. Another problem is that the main frame of an air compressor is usually made of plastic, which can be slightly softened at a higher temperature. Thus, the mounting hole 110 is liable to undergo a greater force at some area of the mounting hole 110 during the reciprocating motion of the piston 14. As the piston 14 continues conducting reciprocating motion, the mounting hole 110 will be gradually worn out. Thus, the rotational center of the crankshaft 162 may not be fixed at a point. As can be seen in FIG. 11, the motion path of the crankshaft 162 is schematically indicated by the symbol (A), while the motion path of the crankpin 164 is schematically indicated by the symbol (C), which is non-circular. Under these circumstances, when the piston 14 conducts reciprocating motion within the cylinder 12, the motion path of the piston 14 may deviate from its normal path, as shown by the dashed lines in FIG. 10, thus reducing the performance of the air compressor, and furthermore, the deviation of the motion path of the piston may cause damages on the head portion 144 of the piston 14 and the bearing 111, thereby reducing the service life of the air compressor.

SUMMARY OF THE INVENTION

One object of the present invention is to provide a method of mounting a bearing to an air compressor which includes a shaft element having a first end and a second end and is widely used together with a sealant dispenser for repairing a punctured tire. The method comprises the steps of: fixing the second end of the shaft element to a center of a gear; inserting the first end of the shaft element through a central hole of the bearing to have an annular step of the shaft element abutted an inner ring of the bearing; and hitting the first end of the shaft element by a striking tool to form an expanded or flared edge on a top face of the first end of the shaft element; whereby the bearing can be firmly fixed between the expanded or flared edge and the annular step of the shaft element.

Another object of the present invention is to provide an air compressor, which generally comprises a base frame, a cylinder with an air storage container, a gear, and a crank mechanism. The base frame defines a first mounting hole, which allows a pinion driven by a motor to pass, and a second mounting hole for receiving therein a bearing which includes an outer ring, an inner ring defining a central hole, and a plurality of rolling balls disposed therebetween. The cylinder is fixed to or formed integrally with the base frame. The air storage container is provided with one or more outlet tubes, and connected and communicated with the cylinder. The gear is disposed in mesh with the pinion. The crank mechanism includes a counterweight, a crankpin connected with a piston, and a shaft element having a first end and a second end, wherein the second end has a diameter greater than the first end, thus forming an annular step therebetween. The second end of the shaft element is fixed to a center of the gear. The first end of the shaft element is inserted through the central hole of the inner ring of the bearing and hitted by a striking tool to form an expanded or flared edge on a top face of the first end of the shaft element, so that the bearing can be firmly fixed between the expanded or flared edge and the annular step of the shaft element.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
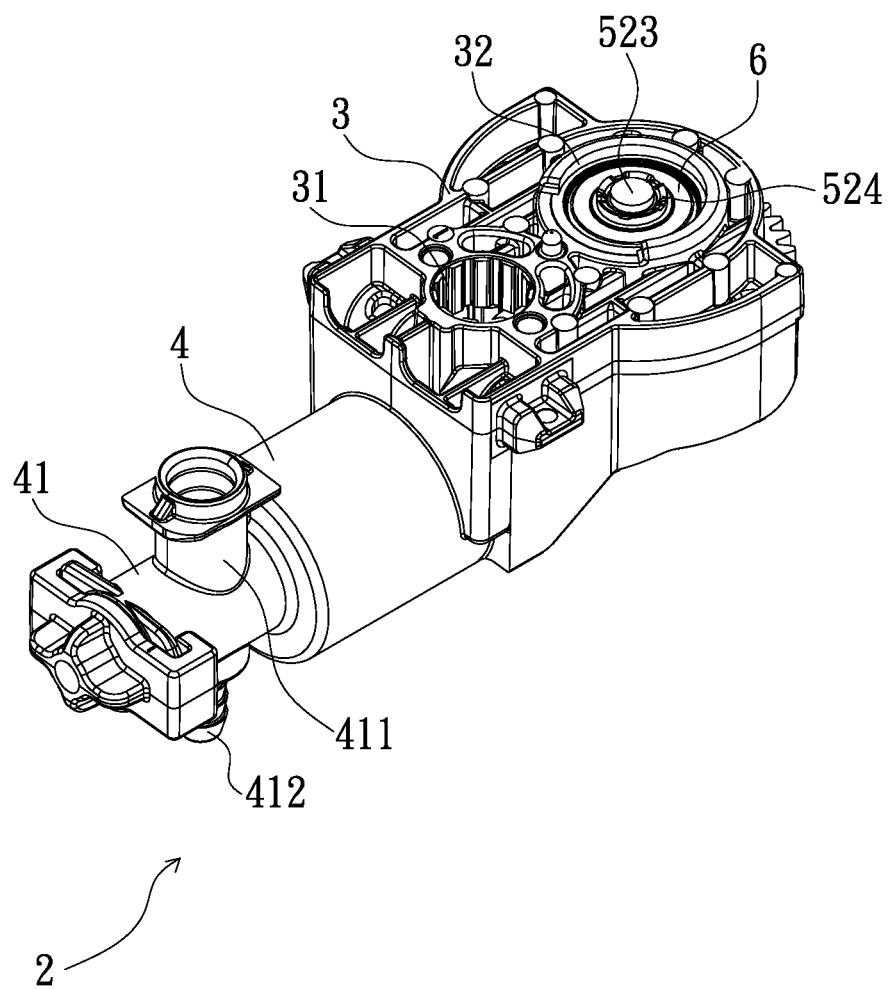
FIG. 1 shows a 3-dimensional view of a main structure of an air compressor.
Figure 2:
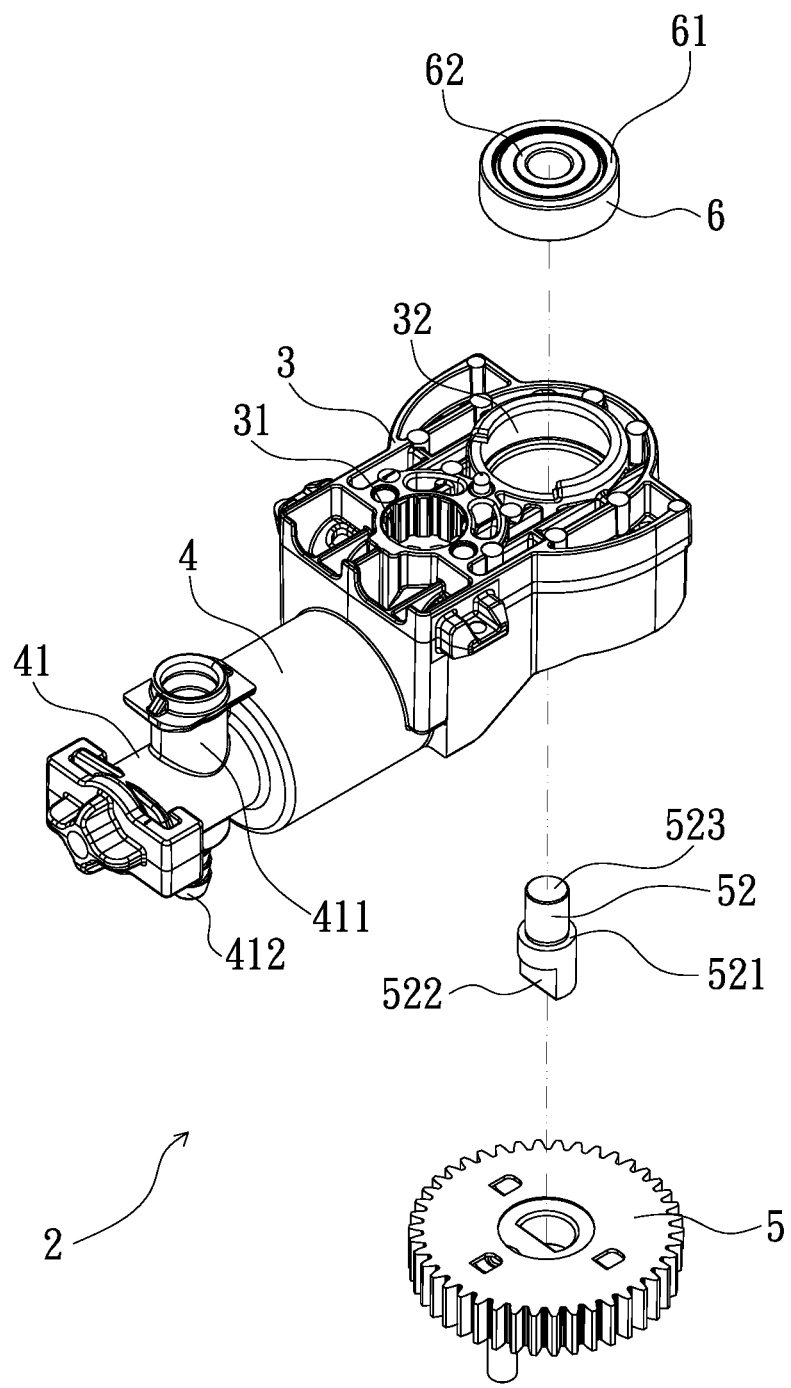
FIG. 2 shows a partially exploded view of the main structure of the air compressor.
Figure 3:
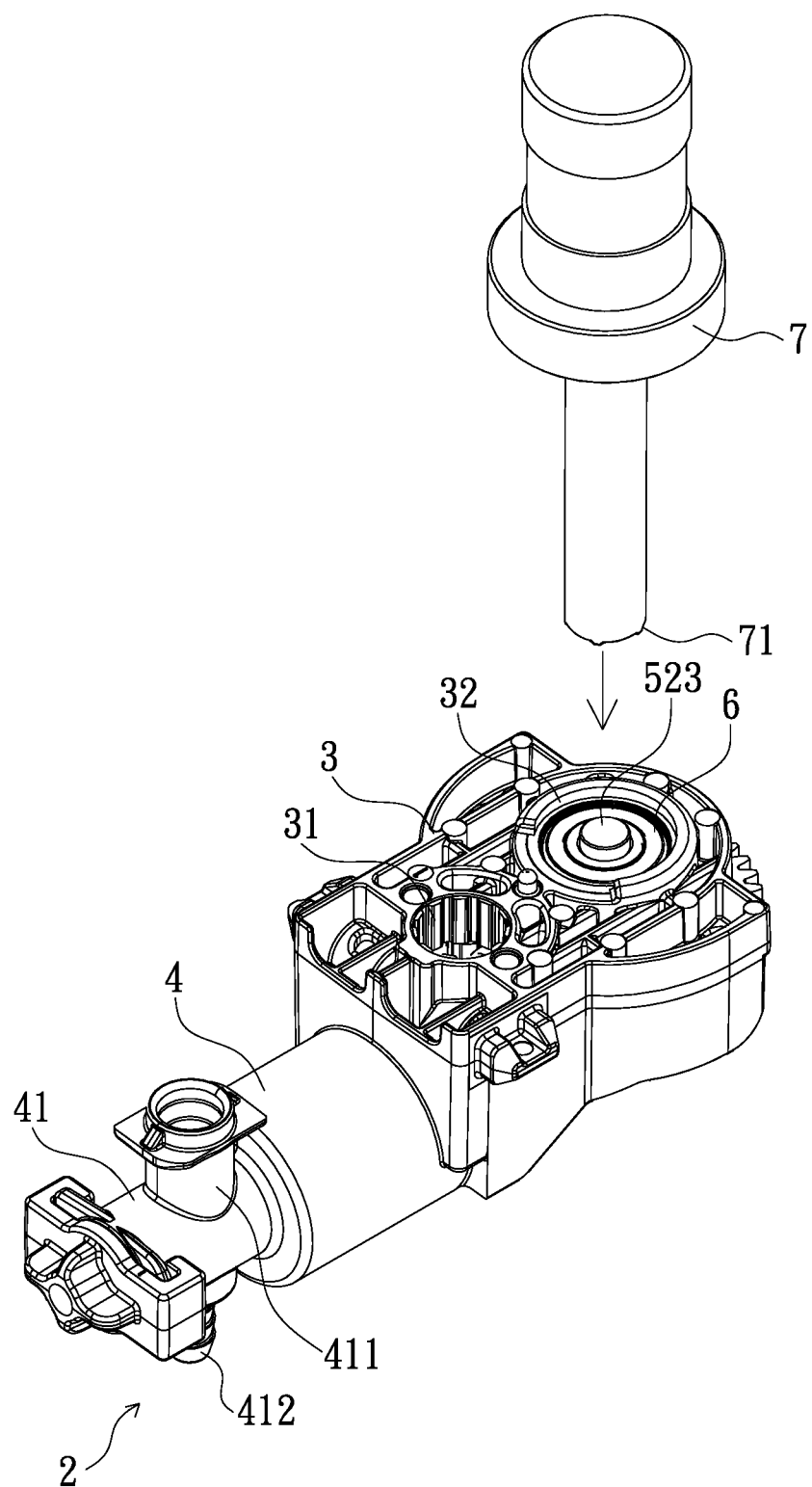
FIG. 3 shows a schematic working view of the present invention, wherein a striking tool is employed to hit one end of a shaft element for fixing a bearing in place.

FIGS. 1 and 2 show a main structure of a typical air compressor, through which a method of mounting a bearing to an air compressor, which is especially used together with a sealant dispenser for repairing a punctured tire, will be illustrated. As shown, the air compressor, indicated by reference numeral 2, generally includes a base frame 3, a cylinder 4 with an air storage container 41, a gear 5, and a crank mechanism including a counterweight (not shown), a crankpin (not labeled) connected with a piston (not shown), and a shaft element 52.

Figure 5:
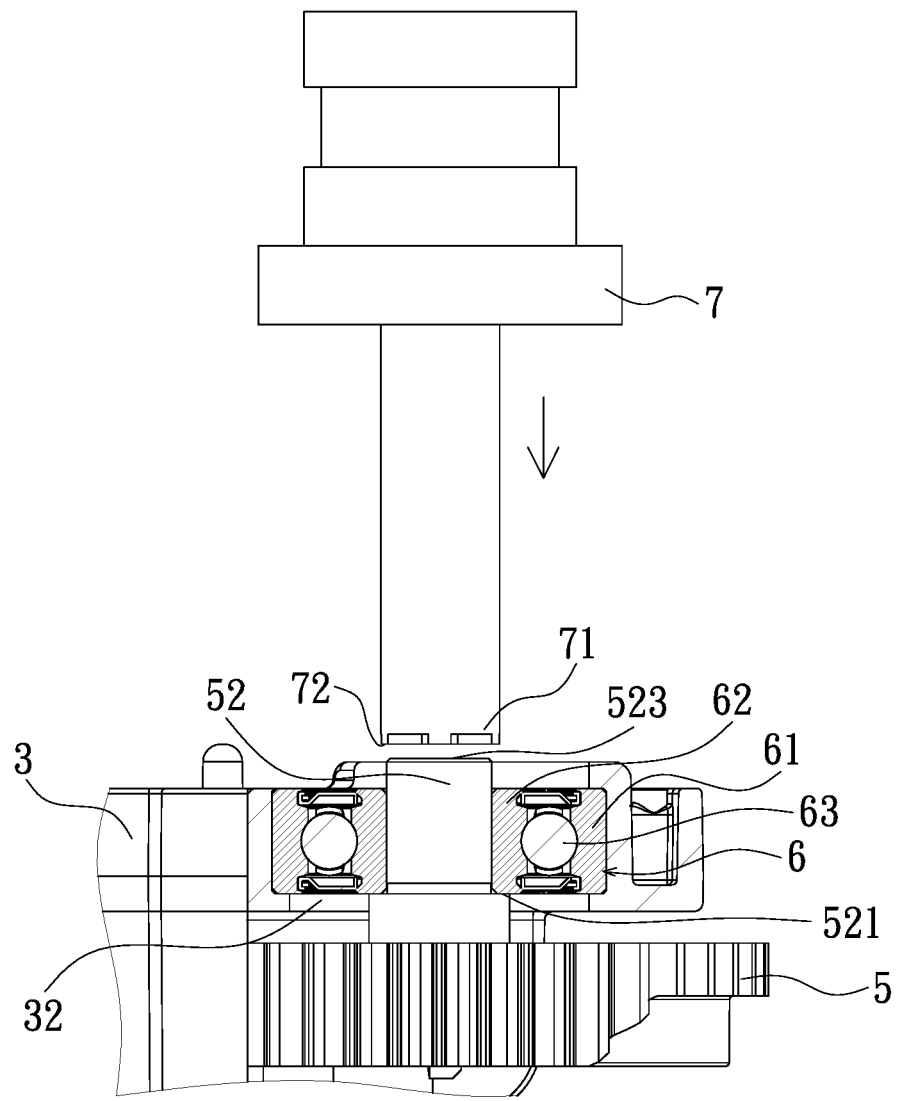
FIG. 5 shows a partial sectional view of the main structure of the air compressor, wherein the striking tool is approaching the shaft element to conduct a hitting operation.

The base frame 3 defines a first mounting hole 31, which allows a pinion (not shown) driven by a motor (not shown) to pass, and a second mounting hole 32 for receiving therein a bearing 6 which has an outer ring 61, an inner ring 62, and a plurality of rolling balls 63 disposed therebetween (see FIG. 5).

The cylinder 4 is fixed to or formed integrally with the base frame 3. The air storage container 41 is provided with one or more outlet tubes 411, 412, and connected and communicated with the cylinder 4. The outlet tubes 411, 412 can be connected with a hose, a relief valve, or a pressure gauge.

The gear 5 is disposed in mesh with the pinion (not shown). The counterweight (not shown) is provided on the gear 5. The shaft element 52, which serves as a crankshaft for the air compressor 2, can be made of a metal or alloy and has a first end and a second end opposite to the first end, wherein the second end has a diameter greater than the first end, thus forming an annular step 521 therebetween. The shaft element 52 has a circular top face 523 on its first end, and defines a cutout 522 at its second end so that the second end can be shaped as a non-circular portion, such as a semicircular portion. The gear 5 defines at its center a non-circular hole, such as a semicircular hole, corresponding to the non-circular portion formed at the second end of the shaft element 52.

Figure 6:
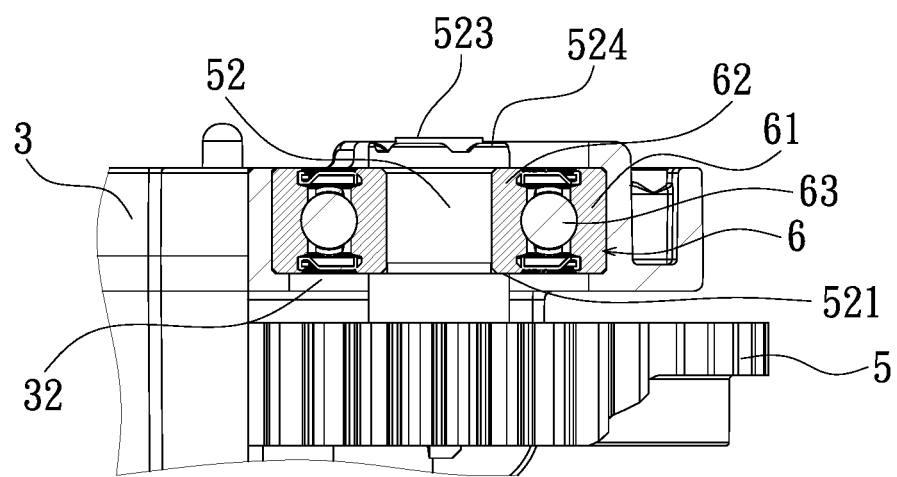
FIG. 6 shows a partial sectional view of the main structure of the air compressor, wherein the striking tool has completed the hitting operation.
Figure 7:
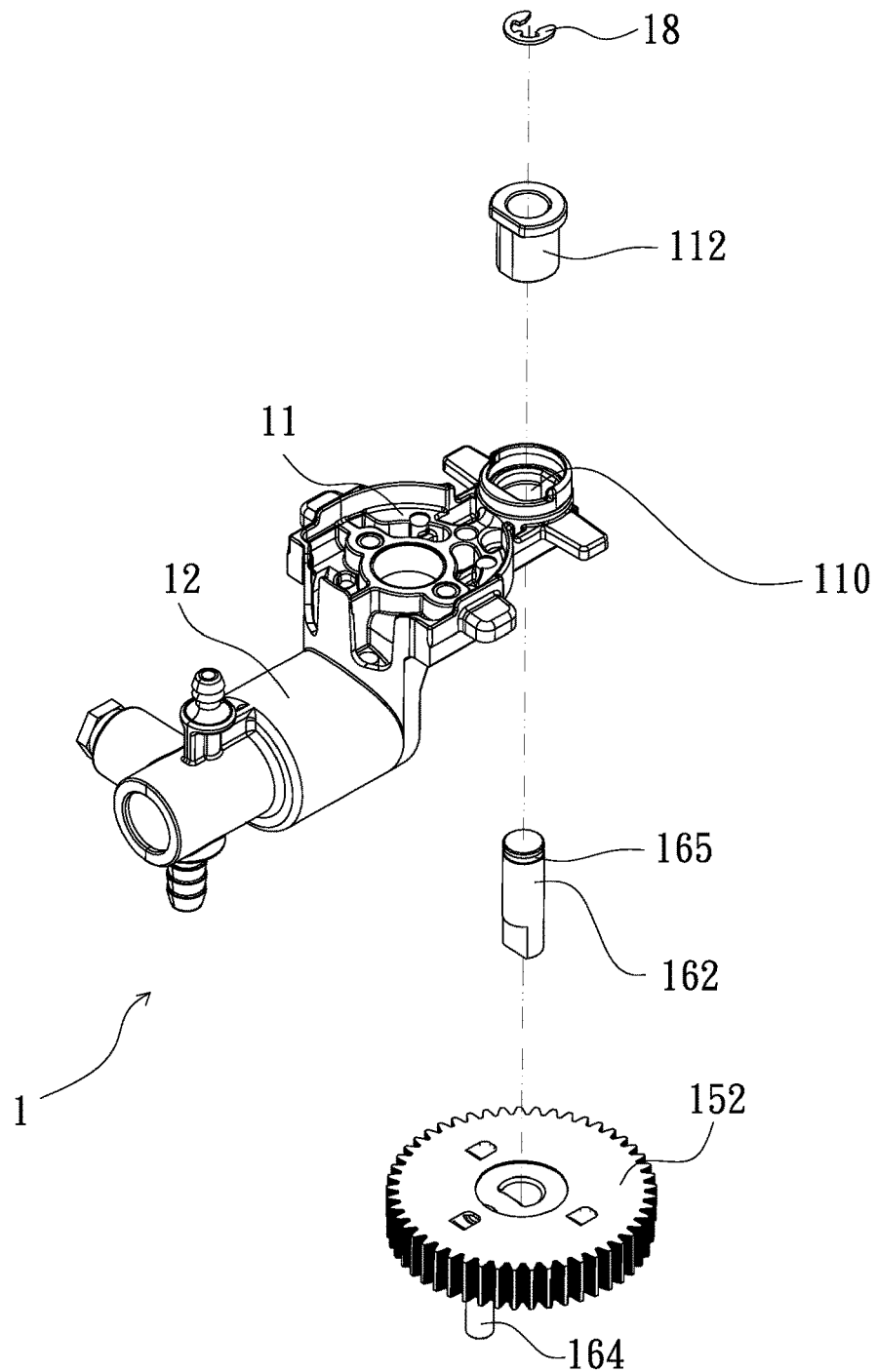
FIG. 7 shows a partial exploded view of a main structure of a prior-art air compressor.
Figure 8:
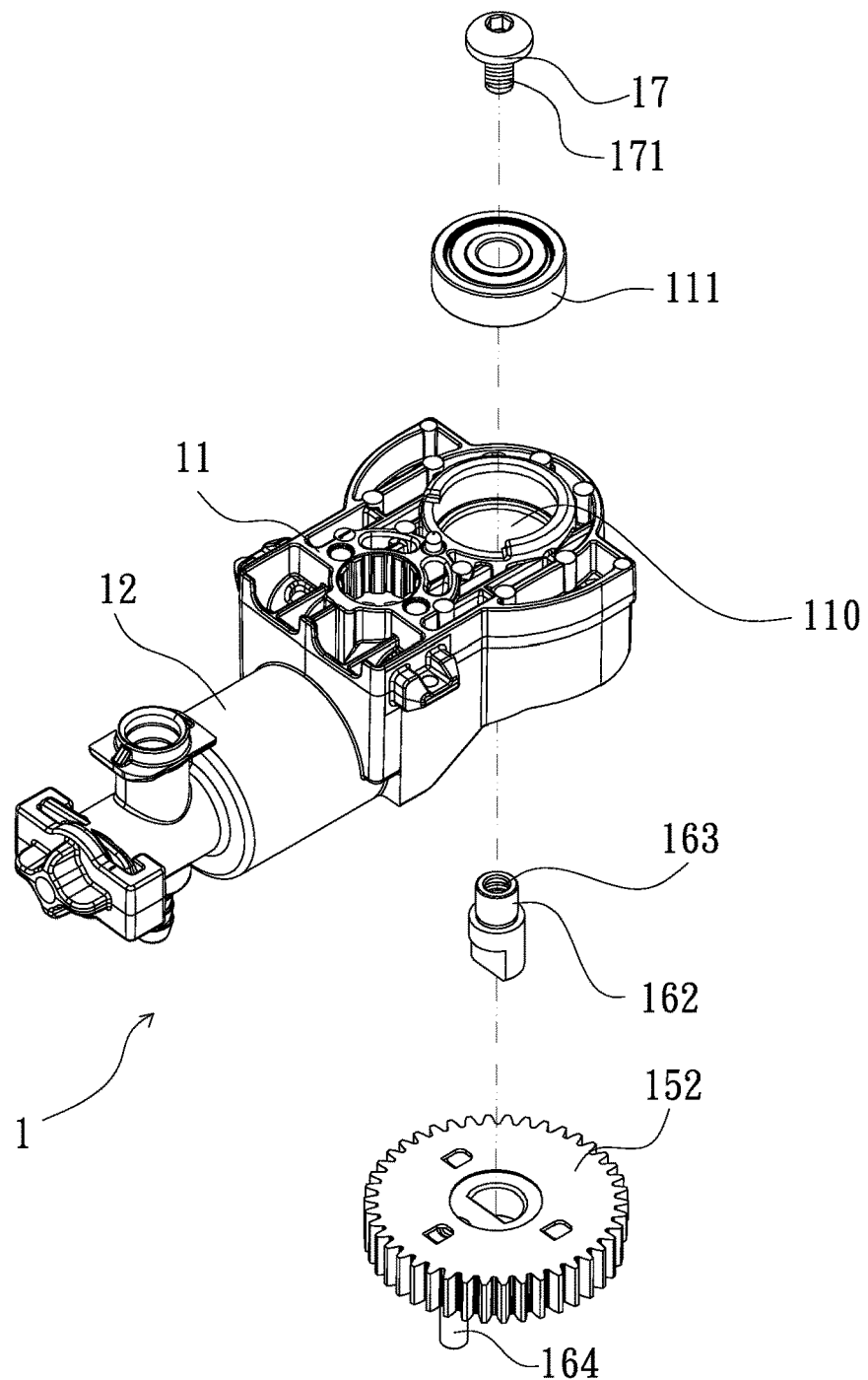
FIG. 8 shows a partial exploded view of a main structure of a second prior-art air compressor.
Figure 9:
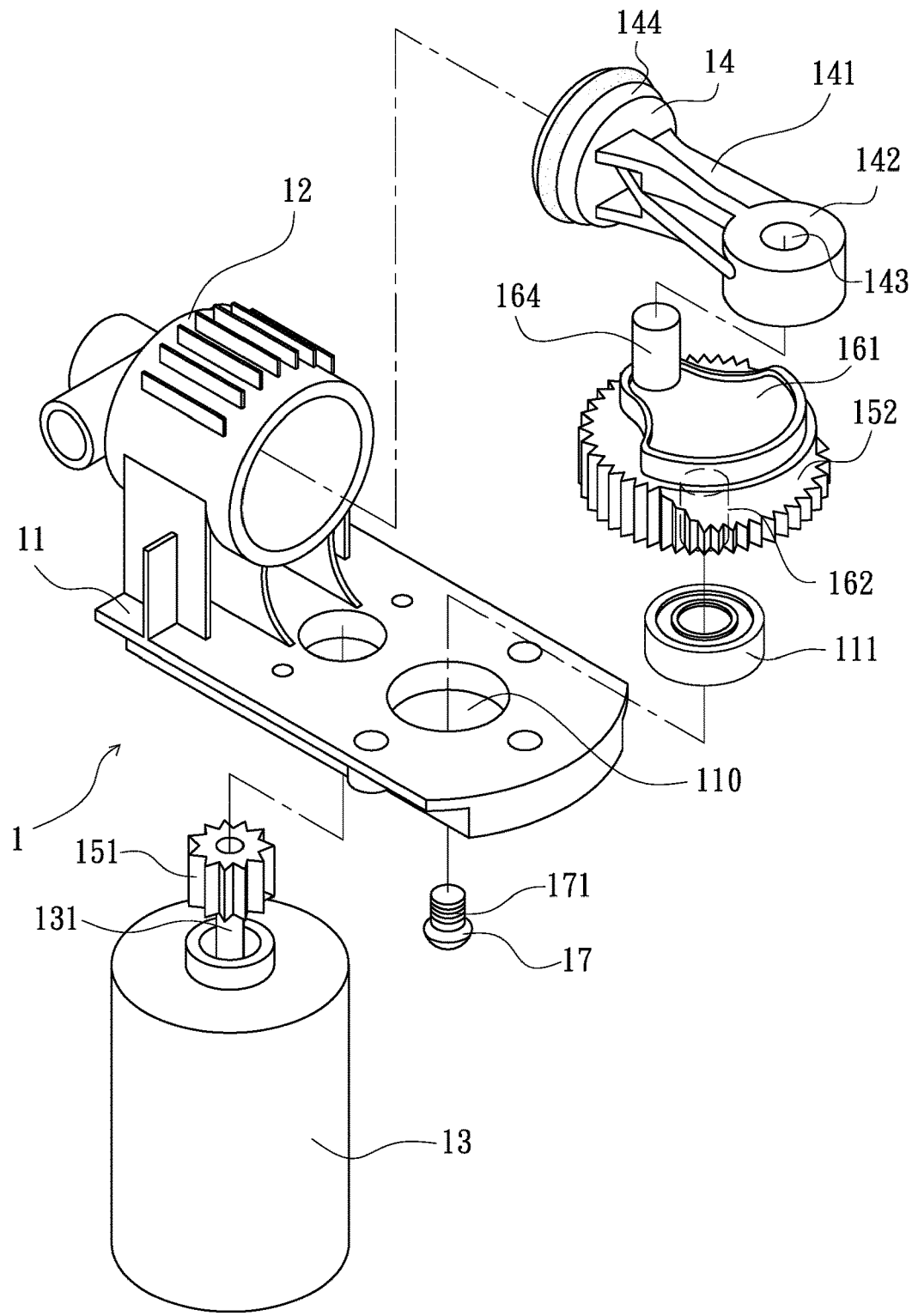
FIG. 9 shows an exploded view of a third prior-art air compressor.
Figure 10:
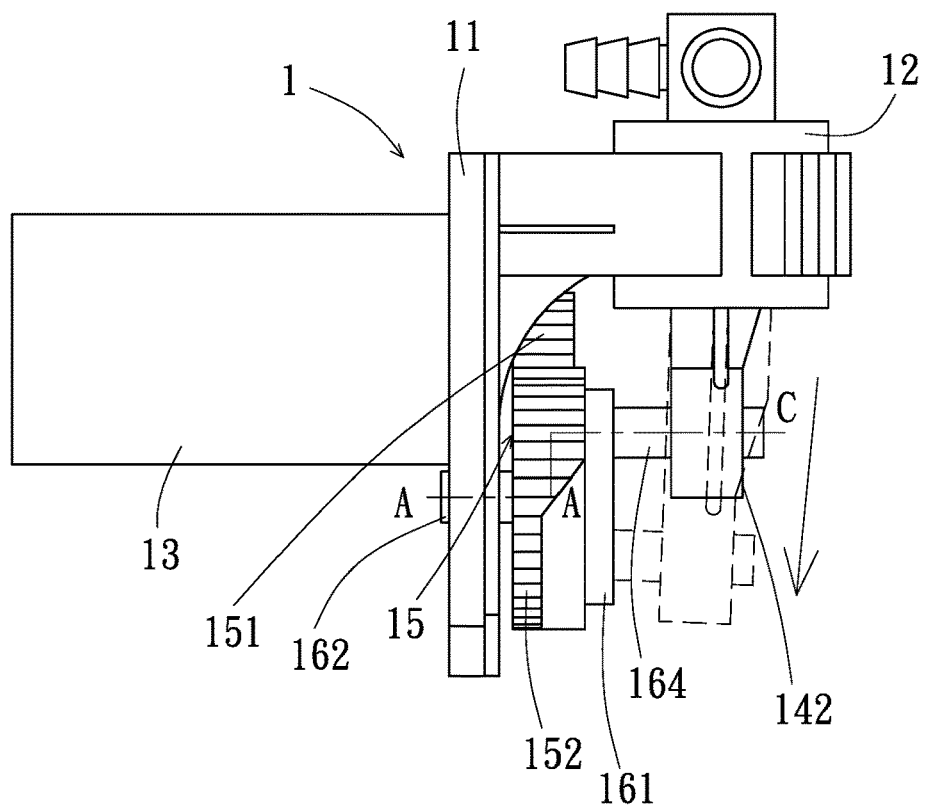
FIG. 10 shows a schematic plan view of the third prior-art air compressor, wherein the motion path of the piston is indicated by dashed lines.
Figure 11:
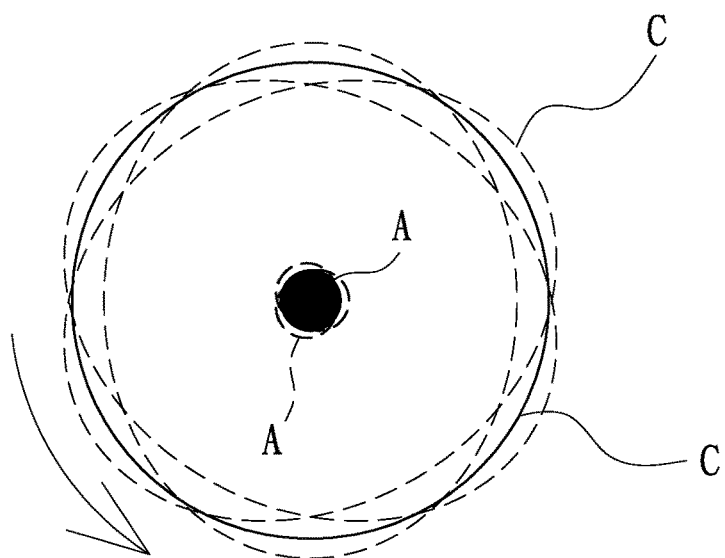
FIG. 11 shows a schematic view of the motion paths of the crankshaft and the crankpin used in a prior-art air compressor.

The method of the present invention comprises the following steps:

Step 1: fixing the second end of the shaft element 52 to a center of the gear 5; for example, the second end of the shaft element 52 being snugly fitted into the corresponding hole defined at the center of the gear 5;

Step 2: inserting the first end of the shaft element 52 through the central hole of the bearing 6 to have the annular step 521 of the shaft element 52 abutted the inner ring 62 of the bearing 6 (see FIG. 5); and Step 3: hitting the first end of the shaft element 52 by a striking tool 7 to form an expanded or flared edge 524 on the top face 523 of the first end of the shaft element 52 (see FIG. 6.); as a result, the bearing 6 can be firmly fixed between the expanded edge 524 and the annular step 521 of the shaft element 52.

Figure 4:
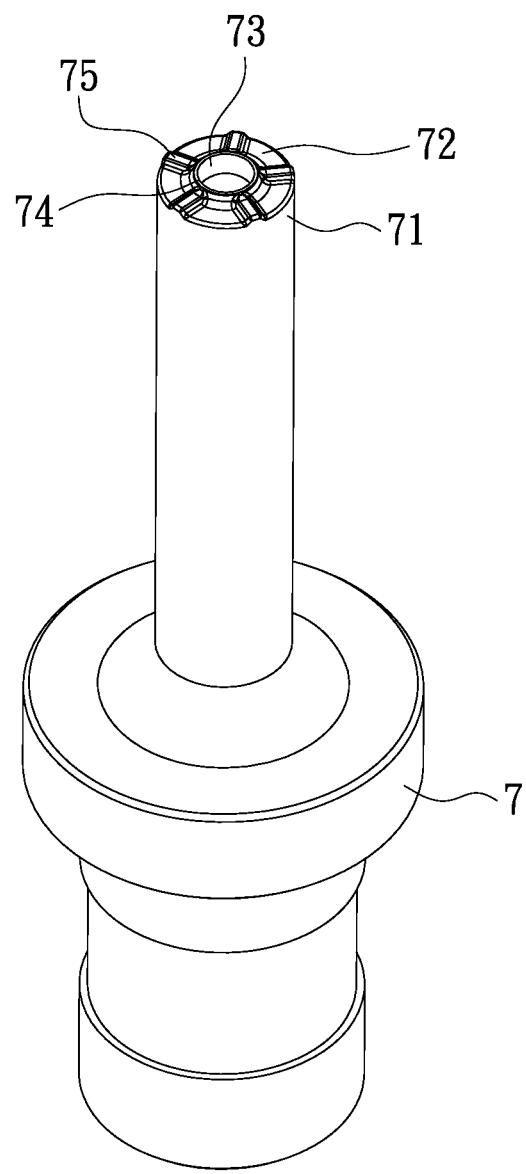
FIG. 4 shows a 3-dimensional view of the striking tool.

To facilitate forming an expanded or flared edge on the first end of the shaft element 52, it is preferred that, as shown in FIG. 4, the striking tool 7 includes a shank having a press head 71 at one end defining a central recess 73 and provided with an annular protrusion 74 around the central recess 73 and a plurality of radial protrusions 75 spaced at equal intervals and extending outwardly from the annular protrusion 74 to form a plurality of flat surface sections 72 between the radial protrusions 75. With the tool, a plurality of equally spaced indentations extending outwardly from a central portion of the top face 523 of the first end of the shaft element 52 can be formed by the radial protrusions 75 of the striking tool 7 in addition to the expanded or flared edge 524.

By using the method of the present invention, the bearing 6 can be firmly mounted with the shaft element 52 in the second mounting hole 32 to prevent damages, and the reciprocating motion of the piston 14 can follow its normal straight path. An air compressor, in which the bearing associated with the crankshaft is mounted according to the method of the present invention, the piston thereof can conduct reciprocating motion more smoothly, and thus the performance and service life of the air compressor can be increased.

As a summary, the present invention provides a method of mounting a bearing to an air compressor, and an air compressor, in which a bearing is mounted by using the method. By using a striking tool hitting one end of a shaft element, the bearing can be firmly fixed between an expanded or flared edge and an annular step of the shaft element.

I claim:

1. A method of mounting a bearing to an air compressor, the air compressor including: a base frame defining a first mounting hole, which allows a pinion driven by a motor to pass, and a second mounting hole for receiving therein a bearing which has an outer ring, an inner ring defining a central hole, and a plurality of rolling balls disposed between the outer ring and the inner ring; a cylinder fixed to or formed integrally with the base frame; an air storage container comprising one or more outlet tubes and connected with the cylinder; a gear in mesh with the pinion; a crank mechanism including a counterweight provided on the gear, and a shaft element having a first end and a second end, wherein the second end has a diameter greater than the first end, thus forming an annular step therebetween;

the method comprising the steps of:
  fixing the second end of the shaft element to a center region of the gear;
  inserting the first end of the shaft element through the central hole of the bearing to cause the annular step of the shaft element to abut the inner ring of the bearing; and
  hitting the first end of the shaft element with a striking tool to form an expanded or flared edge on a top face of the first end of the shaft element;

whereby the bearing is fixed between the expanded or flared edge and the annular step of the shaft element; and wherein the striking tool includes a shank having a press head defining a central recess and comprising an annular protrusion around the central recess and a plurality of radial protrusions spaced at equal intervals and extending outwardly from the annular protrusion to form a plurality of flat surface sections between the radial protrusions to facilitate forming the expanded or flared edge on the top face of the first end of the shaft element.

2. The method of claim 1, wherein a plurality of equally spaced indentations extending outwardly from a central portion of the top face of the first end of the shaft element are formed by the striking tool in addition to the expanded or flared edge.

\* \* \* \* \*